(12) United States Patent
Jansson

(10) Patent No.: US 10,145,666 B2
(45) Date of Patent: Dec. 4, 2018

(54) TOUCH PROBE FOR CMM INCLUDING DIGITAL SIGNAL COMMUNICATION

(71) Applicant: Mitutoyo Corporation, Kanagawa-ken (JP)

(72) Inventor: Bjorn Erik Bertil Jansson, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 190 days.

(21) Appl. No.: 15/383,544

(22) Filed: Dec. 19, 2016

(65) Prior Publication Data

US 2018/0172416 A1 Jun. 21, 2018

(51) Int. Cl.
*G01B 5/016* (2006.01)
*G01B 5/012* (2006.01)

(52) U.S. Cl.
CPC ............. *G01B 5/016* (2013.01); *G01B 5/012* (2013.01)

(58) Field of Classification Search
CPC ...................................... G01B 5/016
USPC .................................... 33/561, 558
See application file for complete search history.

(56) References Cited

U.S. PATENT DOCUMENTS

| | | | | |
|---|---|---|---|---|
| 4,443,946 A | * | 4/1984 | McMurtry | G01B 7/012 33/561 |
| 4,553,001 A | * | 11/1985 | Kroetsch | B82Y 15/00 200/61.41 |
| 4,734,994 A | * | 4/1988 | Cusack | G01B 7/012 33/561 |
| 4,817,362 A | | 4/1989 | Archer | |
| 5,084,981 A | * | 2/1992 | McMurtry | G01B 7/012 33/1 D |
| 5,150,529 A | * | 9/1992 | Collingwood | G01B 21/047 33/503 |
| 5,210,519 A | | 5/1993 | Moore | |
| 5,247,751 A | * | 9/1993 | Ohya | G01B 7/012 33/558 |

(Continued)

OTHER PUBLICATIONS

Extended European Search Report, dated Apr. 10, 2018, for European Application No. 17208571.4-1022, 5 pages.

(Continued)

*Primary Examiner* — Christopher W Fulton
(74) *Attorney, Agent, or Firm* — Seed IP Law Group LLP

(57) ABSTRACT

A compact CMM touch probe may include internal digital processing, a regulated power circuit, a trigger signal generating circuit, an interface connector limited to two electrical connections, and a differential signal configuration that inputs and outputs differential digital communication signals (including touch trigger signals) through the two connections, superimposed on a CMM supply voltage connected to them from the CMM. A specialized supply isolation circuit is configured in combination with various probe components and operating parameters, to couple the regulated power supply circuit to the CMM supply voltage at the two connections, while isolating it from loading the differential digital signals, which are AC coupled to the two connections. The differential digital signals may normally comprise touch trigger signals, and intermittent control and data signals, during separate respective time periods. In various embodiments, at least a majority of the differential digital signals are formatted using a DC-balanced encoding scheme.

16 Claims, 4 Drawing Sheets

(56) References Cited

U.S. PATENT DOCUMENTS

| | | |
|---|---|---|
| 5,526,576 A | 6/1996 | Fuchs et al. |
| 5,644,286 A | 7/1997 | Brosh et al. |
| 5,755,038 A | 5/1998 | McMurty |
| 5,778,552 A * | 7/1998 | LeGuin .................. G01R 1/067 33/503 |
| 5,859,584 A | 1/1999 | Counsell et al. |
| 5,949,352 A | 9/1999 | Ferrari |
| 6,366,831 B1 * | 4/2002 | Raab ..................... B25J 9/1692 33/503 |
| 7,689,176 B2 | 3/2010 | Crivelli |
| 2004/0154177 A1 * | 8/2004 | Jordil .................... G01B 5/012 33/556 |
| 2009/0043534 A1 * | 2/2009 | Prestidge ............... G01B 7/012 702/152 |
| 2011/0002361 A1 | 1/2011 | Woollett et al. |
| 2011/0192044 A1 | 8/2011 | Usui |
| 2014/0144033 A1 * | 5/2014 | Wooldridge ........... G01B 7/012 33/556 |
| 2015/0323300 A1 | 11/2015 | Briegel et al. |
| 2016/0169656 A1 * | 6/2016 | Padovani ............. G01B 21/047 33/503 |

OTHER PUBLICATIONS

Harsila et al., "Coordinate Measurement Probe Body," PCT Application No. PCT/US2017/28175, filed Apr. 18, 2017, 35 pages.

Jansson, "Sensor Signal Offset Compensation System for a CMM Touch Probe," U.S. Appl. No. 62/271,082, filed Dec. 22, 2015, 32 pages.

* cited by examiner

TOUCH PROBE FOR CMM INCLUDING DIGITAL SIGNAL COMMUNICATION

BACKGROUND

Technical Field

This disclosure relates to precision metrology, and more particularly to touch probes used in coordinate measurement systems.

Description of the Related Art

Certain coordinate measurement systems, e.g., one-dimensional or three-dimensional measurement systems, such as coordinate measuring machines (CMMs), may obtain measurements of a workpiece using a touch probe configured to detect when a stylus of the touch probe contacts a workpiece. Touch probes use various types of displacement sensors to sense deflection of the touch probe stylus for an indication that it has contacted a workpiece.

An exemplary prior art CMM utilizing a touch probe is described in U.S. Pat. No. 5,526,576 (the '576 patent), which is hereby incorporated herein by reference in its entirety. The '576 patent discloses a movement mechanism comprising multiple drives for moving the touch probe, an associated electronic system including a CANBUS digital communication system or the like, and features related to processing signals in (or from) the touch probe. A mechanical contact touch probe including two-way communication between the probe in a host machine, using only two wires, is described in U.S. Pat. No. 4,817,362 (the '362 patent), which is hereby incorporated herein by reference in its entirety. In the 362 patent, touching a workpiece causes current changes in an electrical circuit within the probe, which is sensed by a current sensing circuit on the host machine. Communication from the machine to the probe is achieved by varying the voltage supplied to the probe, and initiating different functions in the probe based on the sensed supply voltage.

Another exemplary touch probe is disclosed in U.S. Pat. No. 5,755,038 (the '038 patent), which is hereby incorporated herein by reference in its entirety. The '038 patent discloses a compact touch probe that includes three strain gauges that are responsive to the probe's stylus deflection, and an ASIC processor that receives the strain gauge signals and generates an "auto-zeroed" trigger signal that is output to a host machine through a coaxial electrical connector.

While the systems disclosed in the disclosed in the '576, '362, and '038 patents include features related to processing signals in the touch probes, and/or communicating certain types of operating parameters and/or data using a limited number of wires between the touch probe and a host machine, in practice such features have been accompanied by undesirable tradeoffs. Adversely affected factors have included probe size, and/or the number of wires to the touch probe, and/or the related "retrofit ability" for use or compatibility with existing host machine hardware. Other compromised factors include the limited robustness and scope of the signals that are communicated, and/or ease of use, and the like. Improved systems and features which enable touch probes to communicate additional operating data without adding undesirable tradeoffs (e.g., while maintaining a minimum size, ease of use, and retrofit ability) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Prior art touch probe configurations, including those indicated above, have been determined to have various undesirable combinations of features. The performance levels and miniaturization currently demanded in touch probe bodies has typically forced tradeoffs between all elements combined in such devices, particularly when adding a new feature or capability. For example, increased signal processing internal to a touch probe, and/or increased communication complexity between a touch probe and a host machine, has generally contributed to increased size, an increased number of wires to the touch probe, and/or limited "retrofit ability" for using the touch probe with existing host machine hardware. One factor hindering improved solutions to these problems has been that it has proved difficult to provide configurations that achieve similar high accuracy measurements (e.g., micron or submicron level repeatability), internal signal processing, and digital signal communication with external devices, in a compact configuration (e.g., on the order of 12-15 millimeter diameter in some implementations, or about the size of a human "pinky" finger).

In contrast to the prior art, disclosed herein is a configuration for a touch probe that includes a unique combination of features which allows useful digital signal processing and control functions in a touch probe, as well as reliable trigger signal transmission and two-way digital signal communication with a host CMM, without the need for an associated size increase, and using only two electrical connections between the touch probe and the host CMM. By way of example, and not by way of limitation, such a configuration may allow increased probe functionality and/or ease-of-use, as well as a "retrofit ability" for using the touch probe with existing host machine hardware.

In accordance with various principles disclosed herein, a compact touch probe including internal digital signal processing is provided, for use with a CMM. The compact touch probe comprises: a displacement sensor configured to output at least one sensor signal that is responsive to displacement of a stylus attached to the touch probe; an interface connector including first and second electrical connections that electrically connect the touch probe to the CMM; and touch probe electronic circuitry, included entirely within a housing of the compact touch probe.

The touch probe electronic circuitry comprises a regulated power supply circuit; probe operating circuits and memory; a trigger signal generating circuit that inputs the at least one sensor signal and generates a touch trigger signal corresponding to a displacement of the stylus; and a digital communication circuit including a differential signal configuration that inputs and outputs differential digital signals through the first and second electrical connections. The touch probe electronic circuitry further comprises a specialized supply isolation configuration that is coupled to the first and second electrical connections to receive a connected supply voltage from the CMM through the first and second electrical connections, and is configured to isolate the regulated power supply circuit from loading the differential digital signals that pass through the first and second electrical connections.

In various implementations, the specialized supply isolation configuration comprises: a first end of a first winding of a differential mode choke coupled to the first electrical connection, with a second end of the first winding of the differential mode choke connected to a positive input of the regulated power supply circuit; a first end of a second winding of the differential mode choke coupled to the second electrical connection, with a second end of the second winding of the differential mode choke connected to a negative input (e.g., a circuit ground connection) of the regulated power supply circuit; and at least a first supply isolation capacitor coupled between the positive and negative inputs of the regulated power supply circuit. The specialized supply isolation is configured in combination with other operating characteristics of the touch probe electronics in order to achieve the desirable touch probe characteristics outlined above, without significant compromise. In various implementations, the differential mode choke operating impedance may be significantly smaller (e.g., up to 1000 times smaller) in comparison to known isolation designs used in other type of applications.

In various implementations, the digital communication circuit comprises a differential signal configuration that is AC coupled to the first and second electrical connections through a communication isolation configuration comprising a first capacitor coupled in series to the first electrical connection and a second capacitor coupled in series to the second electrical connection, and the differential signal configuration is configured to input and output the differential digital signals through the first and second electrical connections. In various implementations, the differential digital signals comprise control and data signals that are input and output superimposed on the connected supply voltage during control and data time periods, and touch trigger signals generated by the trigger signal generating circuit that are output superimposed on the connected supply voltage during trigger signal time periods that are different than the control and data time periods. In various embodiments, at least a majority of the differential digital signals are formatted based on a serial communication code scheme that is nominally DC-balanced.

DETAILED DESCRIPTION

Figure 1:
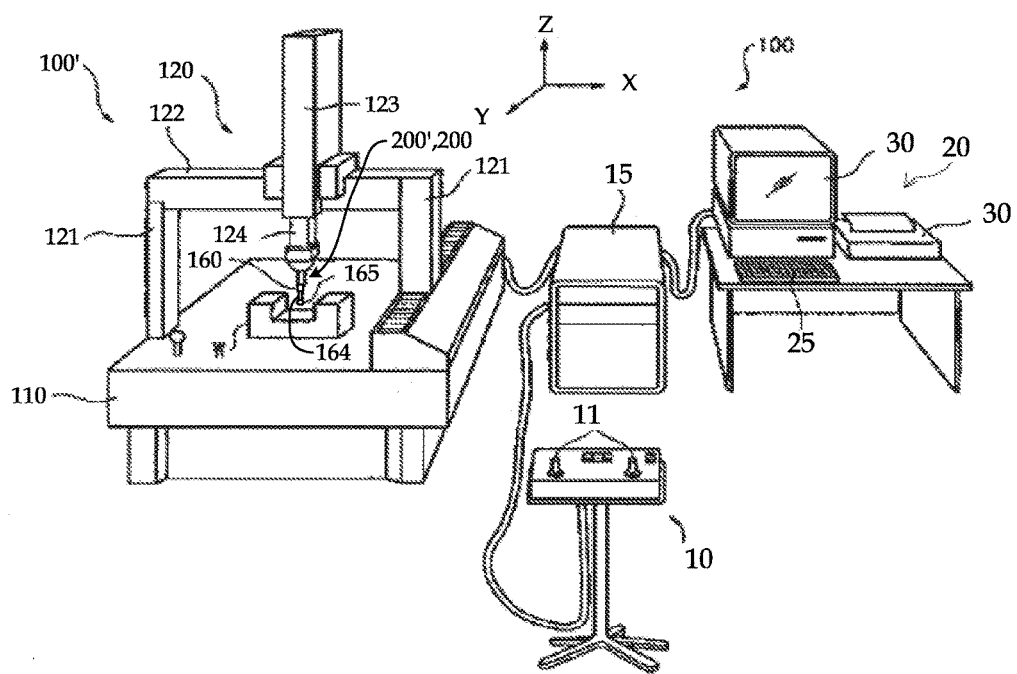
FIG. 1 is a diagram showing various components of a measuring system including a CMM utilizing a touch probe such as that disclosed herein.

FIG. 1 is a diagram showing various components of a measuring system 100 including a CMM 100' utilizing a touch probe 200' such as that disclosed herein. Coordinate measuring machines (CMMs) are known in the art, for example, in U.S. Pat. Appl. Publ. No. 2011/0192044, to Usui, which is hereby incorporated by reference in its entirety. An arrangement of a CMM is illustrated schematically in FIG. 1, showing a measuring system 100 including a CMM 100', which uses a touch probe 200'. The touch probe 200' may include a probe body 200. The measuring system 100 includes an operating unit 10, a motion controller 15 that controls movements of the CMM 100', a host computer 20 and the CMM 100'. The operating unit 10 is coupled to the motion controller 15 and may include joysticks 11 for manually operating the CMM 100'. The host computer 20 is coupled to the motion controller 15 and operates the CMM 100' and processes measurement data for a workpiece W according to known methods. The host computer 20 includes input means 25 (e.g., a keyboard, etc.) for inputting, for example, measurement conditions, and output means 30 (e.g., a display, printer, etc.) for outputting, for example, measurement results.

The CMM 100' includes a drive mechanism 120 which is located on a surface plate 110, and an attachment portion 124 for attaching the touch probe 200' to the drive mechanism 120. The drive mechanism 120 includes x-axis, y-axis, and z-axis slide mechanisms 122, 121, and 123, respectively, for moving the touch probe 200' three-dimensionally. A stylus 164 attached to the touch probe 200' includes a contact portion 165. A stylus module 160 may attach the stylus 164 to a stylus suspension portion of the probe body 200, which allows the stylus 164 to deflect when its contact portion 165 (e.g., a ruby sphere) contacts the surface of the workpiece W, to produce a touch trigger signal. The characteristics and operations of commercially available CMMs are generally known in the art, and are therefore not described in greater detail herein.

The touch probe 200' provides a 3-D tactile probing system having characteristics such as general mechanical stiffness and signal sensitivity to the deflection of the stylus 164, so that the characteristics can be reliably trusted to properly reflect the actual coordinates measured by the probing system, with repeatability at the submicron level. For economical high throughput, it may be generally desirable to perform all operations (e.g., motions and sensing) of the CMM 100' at high speed. An exemplary implementation of a high speed contact detector is disclosed in US Pat. Appl. Publ. No. 2015/0323300, to Briegel et al., which is hereby incorporated herein by reference in its entirety.

Figure 2:
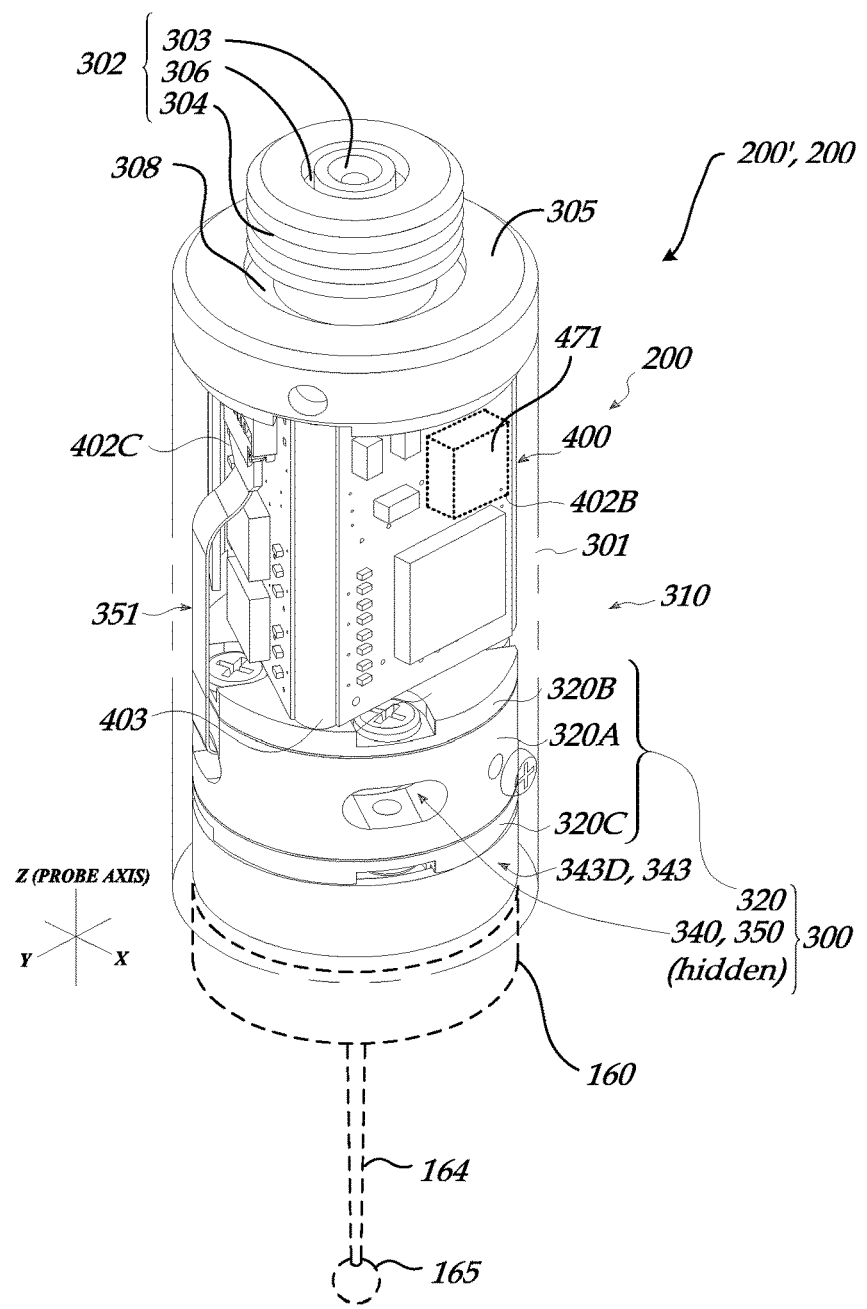
FIG. 2 is a diagram showing a perspective view of an implementation of a touch probe.

FIG. 2 is a diagram showing a perspective view of an implementation of a touch probe 200' including a probe body 200. As shown in FIG. 2, the probe body 200 includes a housing 301 shown in phantom to reveal a circuit board assembly configuration 400 and a moving element assembly 300 disposed in the housing 301. The probe body 200 in this implementation includes the housing 301, a connection assembly 302 configured for mechanically and electrically connecting the probe body 200 to a measuring system such as a CMM (e.g., the CMM shown in FIG. 1); a rigid probe body structure 310, a circuit board assembly configuration 400, and a moving element assembly 300 comprising a compliant element mounting frame 320, a stylus suspension portion 340 (hidden) and a displacement sensing configuration 350 (hidden).

In the illustrated implementation, the connection assembly 302 rigidly connects the probe body 200 and its circuitry to a CMM. The connection assembly 302 includes a threaded connection/connector 304 which is a mounting and electrical connection and a contact electrical connection/connector 303, which are electrically isolated from one another by an insulator 306. The connection assembly 302 is fixed relative to the housing 301. In one embodiment, the connection/connector 304 may include a flange portion (hidden inside an annular housing cap portion 305 in FIG. 2) that is fixed by compression between the housing 301 and the annular housing cap portion 305. In various embodiments the flange portion may be compressed through a surrounding insulator or insulators (e.g., the insulator 308) such that it is electrically isolated from the housing 301 and annular housing cap portion 305. It may be appreciated that the connection assembly 302 includes only two electrical connections, and is functionally similar to a known "legacy" type of touch probe mounting connector, used primarily with analog type touch probe signals. Therefore, the touch probe 200' may used with existing CMM mounting interface hardware, which may include expensive motorized joints and the like. A similar connector assembly is illustrated in FIG. 1 of the incorporated '038 patent, for example. It should be appreciated that the connection assembly 302 is exemplary interface connector only, and not limiting. In various embodiments, an interface connector have two electrical connections may be provided separately from a mechanical mounting arrangement. Though not as elegant as the connection assembly 302, such an arrangement may still be useful in certain retrofit applications, if desired.

FIG. 2 further illustrates a stylus module 160 which rigidly holds a stylus 164 and attaches to a movable stylus capture element 343D included in moving assembly 343 of the probe body 200, which is coupled to the moving element assembly 300. This allows the stylus 164 to deflect when its contact portion 165 contacts the surface of a workpiece, to produce a trigger signal. The compliant element mounting frame 320 is joined to, and forms an additional part of, the rigid probe body structure 310. The compliant element mounting frame 320 includes a central portion 320A, an upper portion 320B and a lower portion 320C, which are clamped together by screws in this implementation. Various compliant and/or moving elements and associated sensing elements are assembled inside the compliant element mounting frame 320, to form the moving element assembly 300.

In one implementation, an axial extension portion 330 (not shown) includes an axial member that has a triangular cross section that is sized to receive the circuit board assembly configuration 400 with the component mounting portions 402A (not visible), 402B, 402C, which may be interconnected by a flexible circuit member (layer) 403, generally aligned to overlie a face of the axial extension portion 330. The circuit board assembly configuration 400 is securely disposed and supported within the housing 301, between an upper mounting portion of the connection assembly 302 and the main body of the moving element assembly 300. A flexible conductor connector 351 may connect signals from the displacement sensors of the displacement sensing configuration 350 to the circuit board assembly configuration 400. The illustrated implementation is exemplary only, and not limiting.

In various implementations, the touch probe 200' is desirably relatively compact and lightweight (e.g., on the order of 12-15 millimeter diameter in some implementations), to facilitate rapid accelerations/decelerations and minimize vibration, all of which contribute to higher precision CMM inspection throughput. It should be appreciated that a compact size and light weight also generally restrict the size and complexity of the internal circuitry. In some implementations, to conserve space and power consumption while providing increased capabilities and processing in the touch probe 200', a commercially available field programmable gate array (FPGA) is included on the circuit board assembly configuration 400, and configured to provide useful or essential functions such as trigger signal processing, serial communications, and certain memory functions using built-in capabilities of the FPGA. The circuit board assembly configuration 400 illustrates a corresponding circuit layout. This provides a "smart" compact touch probe that provides increased functionality, versatility, and ease of use in comparison to a variety of known compact touch probes. However, the advantages of combining such internal processing features with a compact touch probe configuration may not be accepted, if problems associated with the limitation of using only two electrical connections between the touch probe and the host CMM are not overcome (e.g., to provide the legacy CMM interface compatibility advantage outlined previously). Solution(s) to various aspects of this two connection (or "two wire") touch probe interface problem are disclosed herein, as described in greater detail below.

The two wire interface generally requires that power and communication signals are superimposed on the same wires. Doing so is generally known of one skilled in the art of electronic system design, and numerous examples of doing so may be found on the Internet. In addition to some of the incorporated references, US Pat. Nos. 7,689,176, 5,644,286, 5,210,519, and 5,859,584, disclose various alternative systems related to superimposing power and communication signals on the same wires. However, all of these patents require undesirable compromises in terms of requiring wireless data transmission, or extra electrical connections, or limited communication signal content, or incompatible circuit or component sizes, in relation to using their disclosed principles in a compact "smart" touch probe. One aspect of the two wire interface problem is represented in FIG. 2 in the illustration of the circuit board assembly configuration 400, which shows that space on the circuit boards is limited, and furthermore that the allowed height of components inside the housing 301 is limited. One way to isolate the power and communication signals is to employ a choke in a signal or supply isolation configuration. An approximate placement and choke volume 471 is schematically represented in dashed outline.

In general, the choke volume 471 is inadequate for the straightforward use of standard or known isolation circuits in a compact touch probe. Instead, a unique combination of probe features, circuit characteristics, and communication signal features are required for providing reliable "two wire" operation of the compact touch probe 200', or the like, as disclosed in greater detail below.

Figure 3:
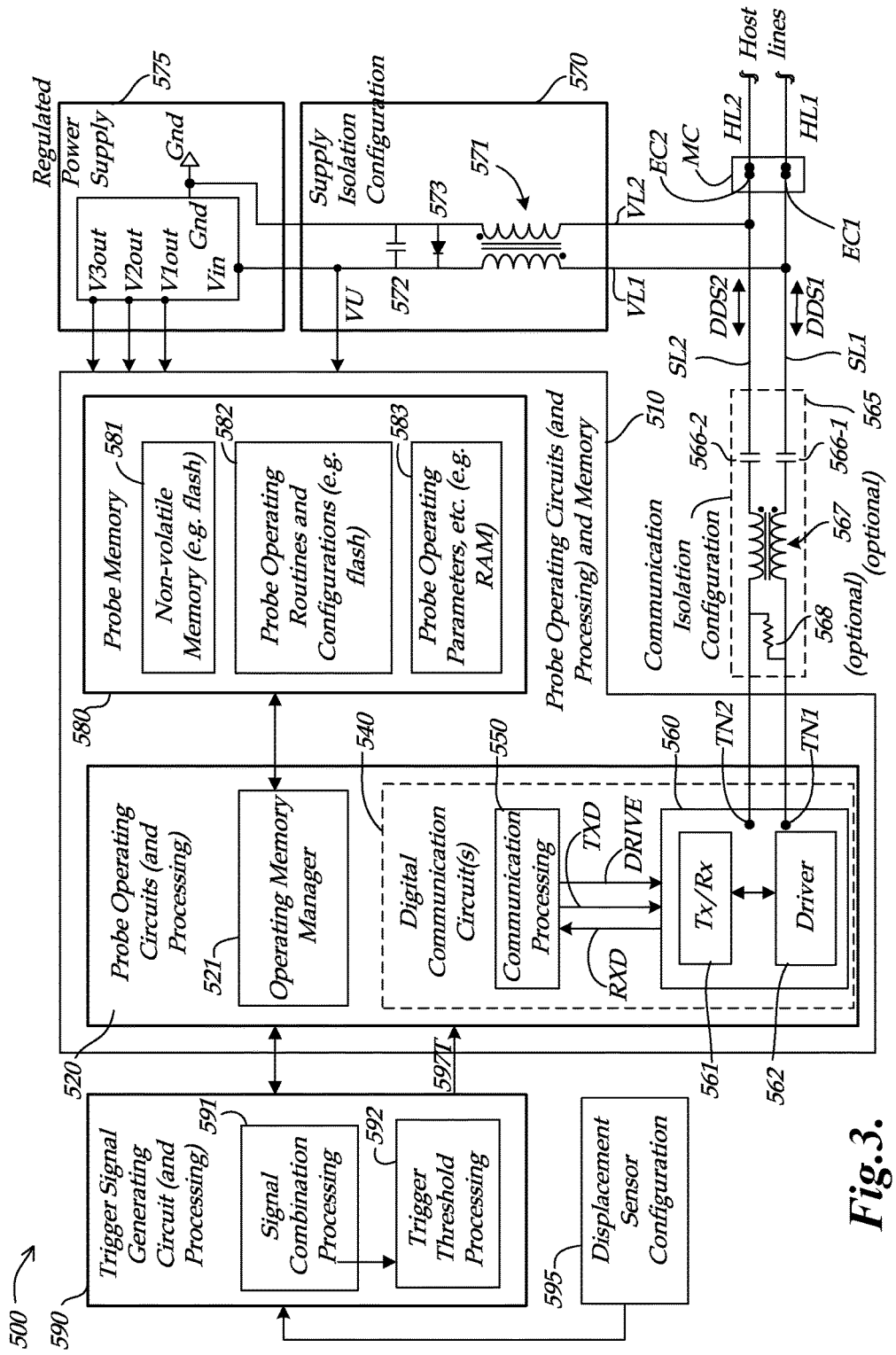
FIG. 3 is a partially schematic block diagram showing one implementation of electronic circuitry for a touch probe including touch probe digital serial communication superimposed on two touch probe power supply lines.

FIG. 3 is a block diagram showing a displacement sensor configuration 595, and various elements of one implementation of electronic circuitry 500 for a touch probe including digital serial communication superimposed on two power supply lines (e.g., as may be included in the circuit board assembly configuration 400 of FIG. 2). In various implementations, a configuration of a compact probe body 200 such as that illustrated in FIG. 2 allows corresponding components to be assembled in the circuit board assembly configuration 400 (e.g., in a compact diameter of 12-15 millimeters) to provide certain signal processing operations in the probe, for example corresponding to the following description, using economical non-custom components. Additional details regarding certain types of electronic circuitry for a touch probe that may perform some similar operations as the electronic circuitry 500 may be found in commonly assigned US Patent Applications No. 62/271,082, and 62/325,763 which are hereby incorporated herein by reference in their entirety.

In the implementation shown in FIG. 3, the electronic circuitry 500 includes a trigger signal generating circuit 590 connected to the displacement sensor configuration 595, probe operating circuits and memory portion 510, a regulated power supply circuit 575, and a supply isolation configuration 570. In various embodiments, the displacement sensor configuration 595 may comprise at least one displacement sensor (e.g., 3 or 4 strain gauges, or more) and output at least one sensor signal (e.g., 3 or 4 sensor signals, or more) that is responsive to displacement of the stylus attached to the touch probe. The trigger signal generating circuit 590 may include a signal combination processing portion 591 and a trigger threshold processing circuit 592, and generate a touch trigger signal 597T corresponding to displacement of the stylus, as described in greater detail below. The probe operating circuits (and processing) and memory portion 510 may include probe operating circuits 520 and a probe memory portion 580. It will be appreciated that various circuits described herein may provide various signal processing and/or control operations according to embedded code, or routines or programs, or the like, as will be understood by one of ordinary skill in the art. The probe operating circuits 520 may include an operating memory manager 521 and digital communication circuit(s) 540. The probe memory portion 580 may include a non-volatile memory portion 581, a probe operating routines and configurations memory portion 582, and a probe operating parameters memory portion 583. In the illustrated embodiment, the digital communication circuit(s) 540 may include a communication processing circuit 550, connected to an input/output differential signal configuration 560 comprising a transmitter/receiver portion 561 and a driver integrated circuit portion 562. In various embodiments, the elements of the digital communication circuit 540 and/or the input/output differential signal configuration 560 may be merged and/or indistinguishable. The digital communication circuit 540 is configured to input and output differential digital signals (comprising signal(s) DDS1 and DDS2) on the lines SL1 and SL2 through the first and second electrical connections EC1 and EC2, respectively. In the illustrated embodiment, the connections EC1 and EC2 are part of a connector MC (e.g., the connection assembly 302, shown in FIG. 2.) Exemplary differential digital signals are described further below.

The regulated power supply circuit 575 may be configured to provide one or more regulated voltages (e.g., the voltages V1out, V2out, V3out) to various portions of the electronic circuitry 500, according to known techniques. In one embodiment, the regulated power supply circuit 575 may comprise one or more commercially available voltage regulator IC's outputting voltages of 1.2, 2.5 and 3.3 volts, for example.

In various embodiments, a supply isolation configuration 570 may be used in the lines VL1 and VL2, such that it is coupled through the first and second electrical connections EC1 and EC2 to receive a connected supply voltage from the CMM (e.g., through the host lines HL1 and HL2, which may be connected to the first and second electrical connection EC1 and EC2). The supply isolation configuration 570 is configured to isolate the regulated power supply circuit from loading the differential digital signals DDS1 and DDS2 that pass through the first and second electrical connections EC1 and EC2. One exemplary embodiment of the supply isolation configuration 570 is illustrated in FIG. 3, wherein: a first end of a first winding of a differential mode choke 571 is coupled to the first electrical connection EC1, with a second end of the first winding of the differential mode choke 571 connected to a positive input of the regulated power supply circuit 575; a first end of a second winding of the differential mode choke 571 coupled to the second electrical connection EC2, with a second end of the second winding of the differential mode choke connected to a negative input of the regulated power supply circuit (e.g., the ground input Gnd); and, at least a first supply isolation capacitor 572 is coupled between the positive and negative inputs of the regulated power supply circuit 575. In one implementation, the supply isolation capacitor 572 may have a value on the order of 45 µF (however, this value is exemplary only, and not limiting). In some embodiments, a plurality of parallel supply isolation capacitors may function as the supply isolation capacitor 572 (e.g., due to layout and/or size constraints.) A reverse voltage protection diode 573 may optionally be coupled between the positive and negative inputs of the regulated power supply circuit 575, as shown in FIG. 3.

In various implementations the characteristics of the differential mode choke 571 are selected in combination with other operating characteristics of the touch probe electronics (e.g., the electronic circuitry 500), in order to provide reliable operation for a compact touch probe including digital serial communication superimposed on two power supply lines, without compromising the compactness of the touch probe. For example, in some implementations, the differential mode choke 571 may be selected to have an impedance on the order of 10-25 µH for frequencies associated with the differential digital signals DDS1 and DDS2 (although such an impedance is exemplary only, and not limiting, in various implementations.) This is an extremely small impedance, which may generally be considered too small for the intended function (e.g., by a factor of 1000), in various known applications. According to known principles, it might be thought that using a high frequency for the differential digital signals DDS1 and DDS2 could be useful for increasing the inductive impedance presented to them by the differential mode choke 571. However, in the implementations disclosed herein, in addition to isolating the differential digital signals DDS1 and DDS2 from being loaded by the power supply circuit, the differential mode choke 571 must freely pass DC voltage and/or current. The small impedance outlined above for the differential mode choke 571 allows a small component size, which is advantageous for packaging a compact touch probe, but it also leads to problems with DC current effects saturating the core of the differential mode choke 571 (thereby reducing its effectiveness). Thus, the DC current draw (and/or general power consumption) in a compact touch probe must be minimized in conjunction with using a small differential mode choke 571. High digital signal frequencies may be associated with greater power consumption and/or DC current draw. Therefore, against known teachings, in various compact touch probe electronic implementations disclosed herein, a relatively low frequency digital signal processing and/or digital communication signals is desirably used in combination with a very small differential mode choke 571. In some embodiments, the voltage from the host CMM received at the first and second electrical connection EC1 and EC2 may be approximately 4 volts, and the touch probe electronic circuitry 500 may be configured to draw approximately 100 mA, or 85 mA, or less, in some embodiments. The differential digital communication signals may have an operating frequency or bit rate on the order of 1.5 Mbps in some implementations. Exemplary digital communication signals which may be used in combination with the electronic circuitry 500 in a compact touch probe are described in greater detail below with reference for FIG. 4 and FIGS. 5A-5C. It will be appreciated that the circuit operation and component values outlined above are exemplary only, and not limiting. Various adjustments to the various outlined combinations of characteristics outlined herein may be made, based on adaptations according to principles disclosed herein.

FIG. 3 also schematically shows an "unregulated" voltage VU being supplied to a portion of the electronic circuitry 500, reducing the load and related losses in the regulated power supply circuit 575. In particular, the unregulated voltage VU may be used to power the differential signal configuration 560, which also allows the differential signal(s) DDS1 and DDS2 to have the highest possible differential voltage, to enhance their signal-to-noise (S/N) ratio.

In operation, the displacement sensor configuration 595 is configured to output at least one sensor signal that is responsive to displacement of a stylus (e.g., the stylus 164) as attached to the touch probe. In various implementations, the displacement sensor configuration 595 may include various components and sensors (e.g., internal flexures, strain gauges, etc.) for sensing relatively small deflections of the touch probe stylus. The trigger signal generating circuit 590 may be implemented according to principles known to one skilled in the art of touch probe design and/or as disclosed in the incorporated references. In one exemplary implementation, the trigger signal generating circuit 590 may input a plurality of displacement signals (e.g., from various sensors included in the displacement sensor configuration 595, such as a configuration of four strain gauges, etc.) The signal combination processing portion 591 receives the signals and determines a combined displacement signal (e.g., a displacement magnitude). The trigger threshold processing circuit 592 defines a switching threshold value and compares it to the combined displacement signal. When the combined displacement signal exceeds the switching threshold value, the trigger threshold processing circuit 592 outputs a touch trigger signal 597T indicating that the stylus has contacted a workpiece. A hysteresis circuit at the output may enhance the trigger signal stability using known methods. A further example of trigger signal determination circuits and processing methods, including switching threshold definition, is described in U.S. Pat. No. 7,792,654, which is hereby incorporated herein by reference in its entirety. In the illustrated embodiment, the touch trigger signal 597T may be communicated to a host CMM, or the like, through the digital communication circuit 540 or a portion thereof, as a differential digital signal on the lines SL1 and SL2 and through first and second electrical connections EC1 and EC2, during a trigger signal time period, as described in greater detail below.

In various embodiments, an "AC coupled" communication isolation configuration is used in the lines SL1 and SL2. One exemplary communication isolation configuration 565 is illustrated in FIG. 3, wherein: a first communication isolation capacitor 566-1 is coupled in series to the first electrical connection EC1 and to a first transceiver node TN1 of the differential signal configuration 560, and a second communication isolation capacitor 566-2 is coupled in series between the second electrical connection EC2 and to a second transceiver node TN2 of the differential signal configuration 560. In the illustrated embodiment, the first and second communication capacitors 566-1 and 566-2 are coupled to respective transceiver nodes through a common mode choke 567. However, in some embodiments, the signal reliability and/or noise may be sufficient without the common mode choke 567, and its use is optional. In such embodiments, first communication isolation capacitor 566-1 may be coupled in series directly from the first electrical connection EC1 to the first transceiver node TN1, and the second communication isolation capacitor 566-2 may be coupled in series directly from the second electrical connection EC2 to the second transceiver node TN2. The illustrated embodiment using the optional common mode choke 567 may, in some applications (e.g., in "electrically noisy" systems or environments), provide enhanced signal reliability. In such embodiments, the first communication isolation capacitor 566-1 is coupled in series from the first electrical connection EC1 to a first end of a first winding of the common mode choke 567, and a second end of the first winding of the common mode choke 567 is coupled to a first transceiver node TN1. The second communication isolation capacitor 566-2 is coupled in series from the second electrical connection EC2 to a first end of a second winding of the common mode choke 567, and a second end of the second winding of the common mode choke 567 is coupled to the second transceiver node TN2.

In either of the configurations outlined above, it may be advantageous (but optional) to use a termination resistor 568 coupled between the first and second transceiver nodes TN1 and TN2, with a value selected to match the impedance of the lines SL1 and SL2 according to known impedance matching principles.

In any of the "AC coupled" communication isolation configurations outlined above, the first and second communication isolation capacitors 566-1 and 566-2 pass the "AC" differential digital signal(s) on the lines SL1 and SL2, and block the DC voltage present at the first and second electrical connections EC1 and EC2 from reaching the differential signal configuration 560. The common mode choke 567, if used, blocks common mode signals (a type of noise) from reaching the differential signal configuration 560. In one embodiment, the choke 567 may be relatively small physically and may be selected to provide an impedance on the order of 100 ohms at 100 MHz, in order to suppress broadband noise. In one embodiment, the capacitors 566-1 and 566-2 may have a capacitance of approximately 1 µF. However, these various values are exemplary only, and not limiting.

As previously outlined, in some embodiments, the electronic circuitry 500 may include a commercially available field programmable gate array (FPGA), configured to provide useful or essential functions such as trigger signal processing, serial communications, and certain memory functions using built-in capabilities of the FPGA. In such implementations some of the probe operating circuits (and processing) 520 may be implemented in the FPGA, such as some or most of the digital communications circuits 540, including the communication processing circuit 550. In any case, in various embodiments the communication processing circuit 550 may implement a digital communication protocol (e.g., a serial communication protocol). In the implementation illustrated in FIG. 3, the communication processing circuit 550 implements a serial communication protocol and interacts with and/or controls the differential signal configuration 560 over the signal lines RXD, TXD, and DRIVE. In one implementation, the differential signal configuration 560 may comprise suitable commercially available RS485 transceiver IC's, which are widely available and known to one of ordinary skill in the art, and the signal lines RXD, TXD, and DRIVE are compatible with such transceiver IC's, if desired.

In the illustrated implementation, the line RXD carries serial data received at the transceiver nodes TN1 and TN2 as differential signals from the host CMM. The line TXD carries serial data to be transmitted at the transceiver nodes TN1 and TN2 as differential signals from the touch probe to the host CMM. The line DRIVE is connected to "enable" pins or inputs of the differential signal configuration 560. At any given time, the differential signal configuration 560 can either transmit or receive, but not both simultaneously. A first polarity digital signal on the line DRIVE enables receiving differential digital signals from the host CMM, and the opposite polarity digital signal on the line DRIVE enables transmitting differential digital signals to the host CMM. One exemplary serial communication protocol which may be used in combination with features outlined above is described in greater detail below.

FIG. 4 and FIGS. 5A-5C are diagrams showing certain aspects of one implementation of a serial communication scheme for use with the electronic circuitry of FIG. 3. As previously outlined, in various embodiments disclosed herein a compact touch probe is configured to input and output differential digital signals through the first and second electrical connections EC1 and EC2 (see FIG. 3), which also carry DC power. It will be appreciated that, in addition to the requirement to transmit the touch probe trigger signals through the first and second electrical connections, it may be desirable to transmit and receive other data and/or commands between the touch probe and the host CMM through the first and second electrical connections. One implementation that provides all these features may be conveniently described as using two "signal modes". For example, in a "Command mode" the differential digital signals may comprise control and data signals that are input and output superimposed on the connected supply voltage during control and data time periods, and in a "Normal mode" the differential digital signals may comprise touch trigger signals generated by a trigger signal generating circuit (e.g., the trigger signal generating circuit 590) that are output superimposed on the connected supply voltage during trigger signal time periods that are different than the communication time periods.

Figure 4:
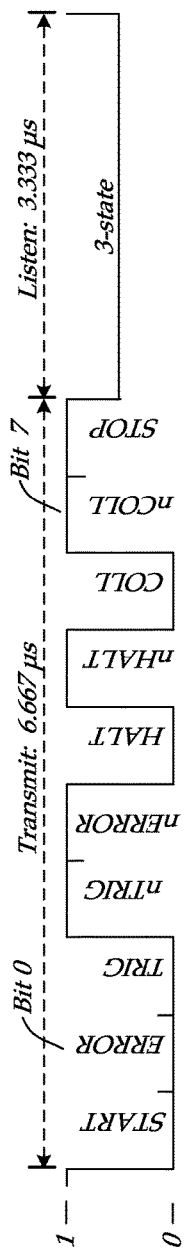
FIGS. 4 and 5A-5C are diagrams showing certain aspects of one implementation of a serial communication scheme for use with the electronic circuitry of FIG. 3.

FIG. 4 shows one exemplary "Normal mode" serial communication protocol that may be used to transmit touch trigger signals (as well as other information) from the touch probe to the host CMM at a desired probe sample cycle rate, which in some implementations is desirably at least 50,000 samples per second during ongoing touch probe measurement operations. In the illustrated implementation, it is 100,000 samples per second during ongoing touch probe measurement operations. In the example shown in FIG. 4, a 10 microsecond "sample period" is divided into two parts, one 6.667 microsecond transmission sub-period "Transmit" (from probe), and one 3.333 microsecond listening sub-period "Listen", where the host controller can initiate a transmission (to the probe), but normally does nothing during ongoing measurement operations. For example, in one implementation, during the Transmit sub-period the signal DRIVE (see FIG. 3) is controlled to put the differential signal configuration 560 in Transmit mode, and the communication processing circuit 550 outputs signals according to a protocol outlined below. Conversely, during the Listen sub-period the signal DRIVE (see FIG. 3) is controlled to put the differential signal configuration 560 in Receive mode, and the communication processing circuit 550 receives signals according to a protocol outlined below.

In the illustrated implementation, this protocol is repetitively streaming four bits of information; the TRIG, HALT, and COLL "trigger" signals and the Error flag, during the "Transmit" sub-period, as described in greater detail below. The complementary bits nTRIG, nHALT, and nCOLL are used so that there are always balanced numbers of '0' and '1' (five each) in this protocol. This allows the DC level of the AC coupled differential digital signals to maintain an average value, such that a varying DC signal component does not arise to leak through the AC coupling and reduce the safety margin for detecting the digital signal information. The bit rate in this example is 15 bits per 10 µs=1.5 Mbps.

In this example, the three trigger signals, the TRIG, HALT, and COLL bits, are indicative of three different displacement thresholds (e.g., as determined in the trigger threshold processing circuit 592, shown in FIG. 3). In the illustrated example, each of the TRIG, HALT and COLL bits are zero or low, which is a "null" trigger signal generated when that the stylus displacement signal indicates that the stylus has not been deflected, and is therefore not in contact with a workpiece surface. The TRIG bit may be regarded as the "conventional" touch trigger signal, which indicates whether the stylus displacement signal currently exceeds the smallest (most sensitive) stylus displacement signal threshold. In response to the TRIG bit indicating the stylus is touching the workpiece (TRIG bit equals 1, or "high"), the host CMM may latch its current position values as a measurement of the touch point coordinates, according to known methods. The HALT bit may be used in some embodiments to assist in control of the host CMM, which may move or "overtravel" beyond the point where the stylus displacement signal corresponds to first touching the workpiece (e.g., as indicated by the TRIG bit), in order to more reliably ensure or confirm a valid touch measurement of the workpiece. The HALT bit indicates whether the stylus displacement signal currently exceeds a stylus displacement signal threshold corresponding to desired stopping point for the "confirming overtravel" of the CMM, beyond the point where the TRIG bit indicates a touch of the workpiece. In response to the HALT bit indicating a desired stopping point for "overtravel" of the CMM (HALT bit equals 1, or "high"), the CMM motion may be stopped, and various measurement validation operations performed if desired, according to known methods. The COLL bit may be used in some embodiments to assist in control of the host CMM, in order to more reliably stop the CMM and minimize potential damage in the case of a "collision" of the stylus with an unexpected object or surface (e.g., an unanticipated fixture on the CMM, or the like). The COLL bit indicates whether the stylus displacement signal currently exceeds a "dangerous" threshold which is not expected to be encountered during normal CMM and/or touch probe operations. In response to the COLL bit indicating an unexpected stylus deflection (COLL bit equals 1, or "high"), the CMM may implement an emergency stop, according to known methods. The Error flag bit may set to 1 or "high" upon the detection of various error conditions in the touch probe (e.g., in the electronic circuitry 500), according to known methods.

The protocol shown in FIG. 4 includes repetitively listening during the "Listen" sub-period (e.g., with the differential signal configuration 560 in Receive mode as outlined above.) If the host CMM initiates a transmission during the Listen sub-period, then the probe protocol changes to Command mode. In Command mode the host CMM can read and write to registers in the probe electronics circuitry 500 (e.g., to registers in the probe memory portion 580), for example for changing the trigger signal threshold levels or enabling filters, or the like. The host CMM may start transmitting the Preamble (described in greater detail below) during the Listen sub-period. The probe electronics circuitry 500 is configured to detect this and enters Command mode. During Command mode the probe suspends the Normal mode protocol outlined above (that is, transmission of trigger signal information is discontinued, etc.).

In Command mode the host controller sends read- and write-commands to the probe electronic circuitry registers. In one exemplary implementation, all Command mode data are transmitted in 8-bit binary form, LSB first, framed by a start bit and a stop bit. In various implementations of the Command mode protocol, it may be desirable to use a DC-balanced encoding scheme (such as the known Manchester encoding scheme, or the like) in the touch probe electronic circuitry (e.g., in the communication processing circuit 550) and the host CMM. In a manner similar to that previously outlined with reference to DC-balance protocol shown in FIG. 4, this allows the DC level of the AC coupled differential digital signals to maintain an average value, such that a varying DC signal component does not arise to leak through the AC coupling and reduce the safety margin for detecting the digital signal information.

Figure 5A:
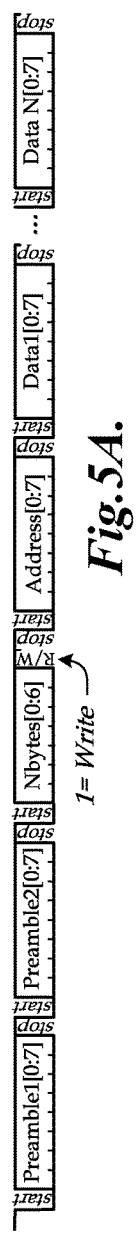
Figure 5B:
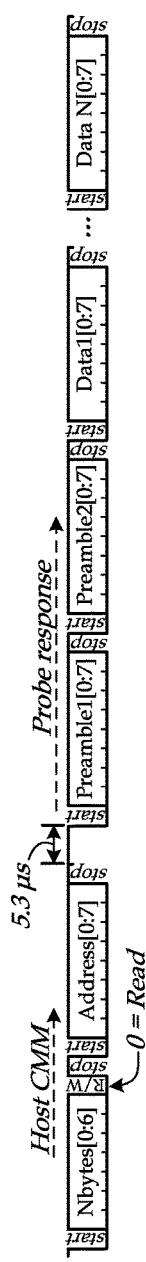

FIGS. 5A and 5B, show one exemplary "Command mode" implementation of a Write Sequence protocol (for host CMM writing to the touch probe) and a Read Sequence protocol (for host CMM reading from the touch probe), respectively. For clarity of description and compactness of illustration, a DC-balanced encoding scheme is not illustrated, but it will be understood that the illustrated bytes may be transmitted using the application of Manchester encoding or the like, according to known methods, for reasons outlined above.

In FIG. 5A, all bytes are written by the host CMM. The first two bytes are the Preamble for synchronization. In this implementation, the Preamble is only sent once as long as the transmit/receive direction remains the same, even when more than one command is sent. The Preamble is described further below with reference to FIG. 5C. In this implementation, the third byte is the command code—where bit seven specifies the Write command, '1', and Nbytes[0:6] specifies the number of data bytes that will follow the address. The maximum value of Nbytes is 127. For example, to write two bytes the command code is $82_{16}$. The fourth byte specifies the address at which the data bytes will be written. The maximum value of the address may be 255 in this implementation. The probe electronic circuitry's internal address register (e.g., as implemented in the operating memory manager 521) may be configured to increment after each byte is written. The fifth byte is the first data byte. There are N data bytes as specified by Nbytes. The probe electronic circuitry may copy the data bytes into its registers starting at the specified register address. After the last data byte, DataN, the probe expects another command from the host CMM. The host CMM should send the command without delay to maintain synchronization.

With regard to FIG. 5B, as previously indicated, in this Command mode implementation, the two-byte Preamble shown in FIG. 5A (and described further with reference to FIG. 5C) is only sent once as long as the transmit/receive direction remains the same, even when more than one command is sent. FIG. 5B assumes that its Read Sequence is not the first command in Command mode—otherwise, the two-byte Preamble would be required in addition to the illustrated bytes. Under these assumptions, in FIG. 5B the host CMM writes the first two bytes and the probe electronics circuitry responds with the illustrated "probe response" bytes. There is a short delay illustrated between the host CMM transmission of the first two bytes, and the probe response transmission of the probe response bytes, allowing the differential signal configuration in the touch probe (e.g., see element 560 in FIG. 3) as well as its counterpart in the host CMM to change the direction of their transceivers. In the illustrated example, this delay is approximately 5.3 µs. After this delay, the probe electronic circuitry responds by sending two Preamble bytes (see FIG. 5C, below), then N bytes starting at the specified address, incrementing the address for each byte. After a Read Sequence protocol ends, in the illustrated implementation the probe electronic circuitry may automatically terminate Command mode and resume the previously outlined Normal mode, by default. (In one implementation, Command mode may be ended under any circumstances by the host CMM sending a Read or Write Sequence, with Nbytes=0. No address or data is needed.)

In various implementations, during the Command mode, the touch probe signal processing associated with generating the trigger signals may be continued in the probe electronic circuitry at the same probe sample cycle as during the Normal mode. In such implementations, when Command mode ends and the Normal mode is resumed, trigger signal data may sent in the Normal mode according to the next "scheduled" data transmission time in the associated ongoing probe sample cycle.

Figure 5C:
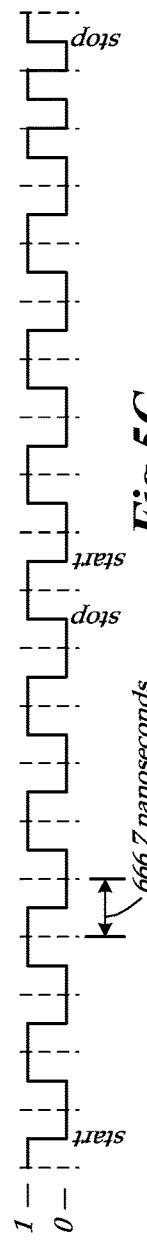

FIG. 5C shows one exemplary "Command mode" implementation of the two-byte Preamble referred to above. In the illustrated example, the Preamble is illustrated including DC-balanced Manchester encoding. As is known, Manchester encoding recovers the clock signal with each data bit and is therefore robust even for long data sequences. As previously indicated, DC-balanced Manchester encoding, or the like, may also maximize the noise safety margin for detecting the AC coupled differential digital communications signals. In the illustrated example it is assumed that Manchester encoding is applied (e.g., in the communication processing circuit 550) between the normal UART signals (e.g., in a portion of the digital communication circuit 540) and the signal lines TXD and RXD. This means that both the start bit and the stop bit are retained in the illustrated communication frames. The illustrated example assumes the application of the phase convention of IEEE 802.3 (Ethernet) where a high-to-low transition represents '0', and a low-to-high transition represents '1'.

The illustrated two-byte preamble serves to synchronize the transceiver receiver and transmitter that are communicating between the host CMM and the probe electronic circuitry. In the illustrated example, the transmitter sends the Preamble code $55_{16}$, $D5_{16}$. Transmitting the LSB first, this code results in the timing diagram of FIG. 5C. The Preamble has the useful feature that, in the first 18 bits, transitions occur only in the middle of the bit-time and not at the bit boundaries (vertical dashed lines.) This makes it easy to synchronize the receiver with the transmitter. The last three bits, '111', signal the end of the Preamble, and the circuitry connected to the receiver is configured to recognize these bits and implement an appropriate "ready state" in order to receive a command or data byte next.

With regard to some examples of use of the Command mode, certain settings (e.g., default settings) for the trigger threshold processing circuit 592, and/or other components or portions of the electronic circuitry 500 may be stored in the probe memory portion 580, such as may be accessed when a powered operating period is first started for the touch probe. However, if it is determined that the default thresholds for the trigger threshold processing circuit 592 are not producing the desired results in a particular environment and/or application (e.g., too many false trigger signals, etc.), a user may operate the host CMM to use the Command mode (e.g., by a user) to provide different thresholds, and/or low pass digital filter settings, etc., to be used by the trigger threshold processing circuit 592. In some implementations, such data may be stored in the CMM host system and may be provided each time a new powered operating period is started, and may override any default settings that are stored in the touch probe memory portion 580. In certain implementations, if the touch probe parameters have been optimized for a particular workpiece inspection sequence, and the touch probe is moved to a second host CMM, any appropriate data/settings stored in the touch probe may be communicated to the second host CMM using the various protocols outlined above, to insure compatible operation with the second CMM host system.

In the foregoing description, communication protocols are disclosed wherein all the differential digital signal bits may be formatted or encoded based on a serial communication code scheme that is DC-balanced. However, it will be appreciated that while this may be preferred in various implementations, it is exemplary only, and not limiting. In some implementations, sufficiently robust operation may be provided with a less strict protocol. For example, in some implementations, it may be sufficient if at least a majority of the differential digital signals are formatted based on a serial communication code scheme that is nominally DC-balanced. Furthermore, it will be appreciated that the various specific component values, specific operating frequencies, and specific communication protocols disclosed above are exemplary only and not limiting.

While preferred implementations of the present disclosure have been illustrated and described, numerous variations in the illustrated and described arrangements of features and sequences of operations will be apparent to one skilled in the art based on the principles exemplified and/or disclosed herein. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A compact touch probe for a coordinate measuring machine (CMM), including internal digital signal processing,
the compact touch probe comprising:
  a displacement sensor configured to output at least one sensor signal that is responsive to displacement of a stylus attached to the compact touch probe,
  an interface connector including first and second electrical connections that electrically connect the compact touch probe to the CMM;
  touch probe electronic circuitry, included entirely within a housing of the compact touch probe, comprising:
    a regulated power supply circuit;
    probe operating circuits and memory;
    a trigger signal generating circuit that inputs the at least one sensor signal and generates a touch trigger signal corresponding to a displacement of the stylus; and
    a digital communication circuit including a differential signal configuration that inputs and outputs differential digital signals through the first and second electrical connections,
wherein:
  the touch probe electronic circuitry further comprises a supply isolation circuit configuration that is coupled to the first and second electrical connections to receive a connected supply voltage from the CMM through the first and second electrical connections and that is configured to isolate the regulated power supply circuit from loading the differential digital signals that pass through the first and second electrical connections, the supply isolation circuit configuration comprising:
    a first end of a first winding of a differential mode choke coupled to the first electrical connection, with a second end of the first winding of the differential mode choke connected to a positive input of the regulated power supply circuit,
    a first end of a second winding of the differential mode choke coupled to the second electrical connection, with a second end of the second winding of the differential mode choke connected to a negative input of the regulated power supply circuit, and
    at least a first supply isolation capacitor coupled between the positive and negative inputs of the regulated power supply circuit,
  the digital communication circuit comprises the differential signal configuration that is AC coupled to the first and second electrical connections through a communication isolation configuration comprising a first communication isolation capacitor coupled in series to the first electrical connection and a second communication isolation capacitor coupled in series to the second electrical connection, and the differential signal configuration is configured to input and output the differential digital signals through the first and second electrical connections, the differential digital signals comprising:
    control and data signals that are input and output superimposed on the connected supply voltage during control and data time periods, and
    touch trigger signals generated by the trigger signal generating circuit that are output superimposed on the connected supply voltage during trigger signal time periods that are different than the control and data time periods; and
  at least a majority of the differential digital signals are formatted based on a serial communication code scheme that is nominally DC-balanced.

2. The compact touch probe of claim 1, wherein the interface connector is a combined mechanical mounting and electrical interface connector for the compact touch probe.

3. The compact touch probe of claim 1, wherein the first and second electrical connections are the only electrical connections in the interface connector.

4. The compact touch probe of claim 1, wherein all of the control and data signals are formatted based on the serial communication code scheme that is nominally DC-balanced.

5. The compact touch probe of claim 1, wherein the touch trigger signals are included in a normal serial communication protocol that is automatically repeated at a probe sample cycle rate during ongoing touch probe measurement operations.

6. The compact touch probe of claim 5, wherein when the stylus is not contacting a workpiece such that there is no stylus displacement, the trigger signal generating circuit generates a null touch trigger signal that is included in the normal serial communication protocol.

7. The compact touch probe of claim 5, wherein the probe sample cycle rate is at least 50,000 samples per second.

8. The compact touch probe of claim 5, wherein the normal serial communication protocol is formatted or encoded such that it is nominally DC-balanced.

9. The compact touch probe of claim 1, wherein the negative input of the regulated power supply circuit is a circuit ground connection.

10. The compact touch probe of claim 1, wherein the communication isolation configuration comprises the first communication isolation capacitor coupled in series directly from the first electrical connection to a first transceiver node of the differential signal configuration, and the second communication isolation capacitor coupled in series directly from the second electrical connection to a second transceiver node of the differential signal configuration.

11. The compact touch probe of claim 1, wherein the communication isolation configuration comprises:

the first communication isolation capacitor coupled in series to the first electrical connection and to a first end of a first winding of a common mode choke, with a second end of the first winding of the common mode choke coupled to a first transceiver node of the differential signal configuration; and the second communication isolation capacitor coupled in series to the second electrical connection and to a first end of a second winding of the common mode choke, with a second end of the second winding of the common mode choke coupled to a second transceiver node of the differential signal configuration.

12. The compact touch probe of claim 1, wherein the differential mode choke has an impedance on at most 25 µH for frequencies associated with the differential digital signals.

13. The compact touch probe of claim 12, wherein the compact touch probe comprises a cylindrical housing and has a diameter of at most 15 mm.

14. The compact touch probe of claim 1, wherein the majority of the differential digital signals have a bit rate of at most 3 Mbps.

15. The compact touch probe of claim 14, wherein the majority of the differential digital signals have a bit rate of at most 1.5 Mbps.

16. The compact touch probe of claim 1, wherein at least the digital signal configuration is coupled to an unregulated voltage at the positive input of the regulated power supply circuit, such that it is powered by that unregulated voltage.

* * * * *